US012516550B2

(12) United States Patent
Banse

(10) Patent No.: US 12,516,550 B2
(45) Date of Patent: Jan. 6, 2026

(54) LOCK

(71) Applicant: ABUS August Bremicker Söhne KG, Wetter-Volmarstein (DE)

(72) Inventor: Manuel Banse, Herborn (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 131 days.

(21) Appl. No.: 17/898,500

(22) Filed: Aug. 30, 2022

(65) Prior Publication Data

US 2023/0061981 A1 Mar. 2, 2023

(30) Foreign Application Priority Data

Sep. 2, 2021 (DE) ......................... 102021122786.0
Jul. 14, 2022 (EP) ..................................... 22185026

(51) Int. Cl.
*E05B 47/06* (2006.01)
*E05B 1/00* (2006.01)
*E05B 71/00* (2006.01)
*E05B 47/00* (2006.01)

(52) U.S. Cl.
CPC ............ *E05B 71/00* (2013.01); *E05B 1/0038* (2013.01)

(58) Field of Classification Search
CPC .... E05B 1/0038; E05B 13/005; E05B 13/105; Y10T 292/0969; Y10T 292/0977; Y10T 292/0964; Y10T 292/0995; Y10T 292/1016; Y10T 292/1021; Y10T 292/1028; Y10S 292/37
See application file for complete search history.

(56) References Cited

U.S. PATENT DOCUMENTS 1,169,659 A * 1/1916 Lowell ...................... E05C 1/06 292/150
1,965,939 A * 7/1934 Jacobi ..................... E05B 83/30 70/DIG. 4
1,968,285 A * 7/1934 Egan ..................... E05B 13/005 292/172

(Continued)

FOREIGN PATENT DOCUMENTS

AT 349929 B 5/1979
DE 803698 C * 4/1951

(Continued)

*Primary Examiner* — Carlos Lugo
(74) *Attorney, Agent, or Firm* — Dickinson Wright PLLC

(57) ABSTRACT

The invention relates to a lock including a locking mechanism having a latch that is movable between a latched position, which is provided for securing a counter-piece movable relative to the locking mechanism, and an unlatched position provided for releasing the counter-piece, and having an actuation element for manually moving the latch into the unlatched position. The lock furthermore includes a coupling element that can be transferred between a coupled state, in which it is coupled to the latch, and a decoupled state, in which it is movable relative to the latch, and that can be moved from a passive position into an active position by means of the actuation element, wherein the latch can be moved into the unlatched position by a movement of the coupling element, which is in the coupled state, from the passive position into the active position by the actuation element.

22 Claims, 7 Drawing Sheets

(56) References Cited

U.S. PATENT DOCUMENTS

| | | | | | |
|---|---|---|---|---|---|
| 2,186,666 | A * | 1/1940 | Cereda | E05C 1/14 | 292/170 |
| 2,765,648 | A * | 10/1956 | Hatcher | E05B 47/0603 | 292/144 |
| 2,786,706 | A * | 3/1957 | Wright | E05B 13/005 | 292/336.3 |
| 3,919,866 | A * | 11/1975 | Lipschutz | E05B 17/04 | 70/81 |
| 4,226,451 | A * | 10/1980 | Gingras | E05B 13/005 | 292/169.21 |
| 4,384,465 | A * | 5/1983 | Muus | E05B 13/005 | 292/172 |
| 4,784,415 | A * | 11/1988 | Malaval | E05B 47/00 | 292/144 |
| 5,588,318 | A * | 12/1996 | Osborne | E05B 47/0002 | 292/144 |
| 5,943,888 | A * | 8/1999 | Lawson | E05B 63/248 | 292/341.15 |
| 6,318,138 | B1 * | 11/2001 | Mathews | E05B 47/0012 | 70/279.1 |
| 6,575,503 | B1 | 6/2003 | Johansson et al. | | |
| 7,647,797 | B1 * | 1/2010 | Viso Cabrera | E05B 1/0038 | 292/144 |
| 8,534,718 | B2 * | 9/2013 | Loret de Mola | E05C 1/12 | 292/191 |
| 8,757,675 | B2 * | 6/2014 | Loret de Mola | E05C 9/046 | 292/170 |
| 8,789,858 | B2 * | 7/2014 | Loret de Mola | E05C 1/085 | 292/164 |
| 9,784,017 | B2 | 10/2017 | Huang | | |
| 12,276,140 | B2 * | 4/2025 | Bendel | E05B 81/32 | |
| 2007/0046035 | A1 * | 3/2007 | Tolley | E05B 85/045 | 292/201 |

FOREIGN PATENT DOCUMENTS

| | | | | | |
|---|---|---|---|---|---|
| DE | 102008014488 | A1 | | 9/2009 | |
| DE | 102012106722 | B4 | | 11/2017 | |
| DE | 102020113121 | A1 | * | 11/2020 | B62H 5/001 |
| DE | 202019005536 | U1 | | 2/2021 | |
| DE | 102020113825 | A1 | | 11/2021 | |
| EP | 3130729 | A1 | | 2/2017 | |
| EP | 3372760 | A1 | | 9/2018 | |
| WO | WO-2021185779 | A1 | * | 9/2021 | B62H 5/001 |

* cited by examiner

LOCK

CROSS-REFERENCE TO RELATED APPLICATIONS

This application claims the benefit and priority of German Patent Application No. 102021122786.0 filed on Sep. 2, 2021, and European Patent Application No. 22185026.6 filed on Jul. 14, 2022. The entire disclosure of each of the above applications is incorporated herein by reference.

FIELD

The invention relates to a lock having a locking mechanism that has a latch that is movable between a latched position, which is provided for securing a counter-piece movable relative to the locking mechanism, and an unlatched position provided for releasing the counter-piece.

BACKGROUND

Such locks are generally known and are, for example, used to secure an energy store at an electric bicycle or another electric vehicle or to lock a transport box or a frame lock of the electric vehicle. The latch of the lock is typically urged by a comparatively strong spring element into the latched position from which it may be moved into an unlatched position by means of an actuation element. In this respect, there is the risk that strong vibrations, e.g. during travel over rough terrain or during jumps, may cause an unintentional movement of the latch against the spring force of the spring element into the unlatched position, whereby an energy store secured by the lock may be lost, for example. Furthermore, in a similar manner, there is the risk of unauthorized access to the lock in that a strong acceleration may be generated by an action on the actuation element with an increased force and a movement of the latch into the unlatched position may thus be forced.

SUMMARY

It is the underlying object of the invention to provide a lock of the initially described kind that is characterized by an increased security and a high operating comfort.

The object is satisfied by a lock having the features of claim 1. In addition to the locking mechanism, the lock in accordance with the invention has an actuation element for manually moving the latch into the unlatched position. Furthermore, the lock comprises a coupling element that may be transferred between a coupled state, in which it is coupled to the latch, and a decoupled state, in which it is movable relative to the latch, and that may be moved from a passive position into an active position by means of the actuation element. The latch may be moved into the unlatched position by a movement of the coupling element, which is in the coupled state, from the passive position into the active position by the actuation element.

The movable counter-piece of the lock may, for example, be an energy store or a component of an energy store, or a bolt of a frame lock or of a brake disk lock, or a closing hoop, or a catch of a lock of a transport box, in each case of a vehicle or of an electric vehicle, in particular of an electric bicycle. The lock may also be used in another vehicle or an electric vehicle, in particular an electric wheelchair, an electric scooter or an electric kart, as well as in a vehicle driven by muscle power. The lock in accordance with the invention may also be provided for locking doors or windows, for example also of a caravan or a motor home, as well as for locking cabinet doors or drawers or transport boxes or containers. Any desired mechanical lock may generally be replaced by the lock in accordance with the invention.

In its latched position, the latch may engage into or engage behind a recess of the counter-piece to prevent a removal of the counter-piece from the locking mechanism. Conversely, the latch itself may have a recess into which a corresponding structure of the counter-piece or of the energy store may engage in the latched position. If the lock is provided for securing an energy store, the latch may, in its latched position, engage into a recess of the energy store or engage behind a projection of the energy store such that the removal of the energy store is blocked.

The invention provides that the actuation element does not act directly on the latch to move the latch from the latched position into the unlatched position. Instead, the actuation element cooperates with a coupling element that may be transferred from a passive position into an active position by the actuation element.

In a coupled state, the coupling element is coupled to the latch such that a movement of the coupling element is transmitted to the latch. In this respect, a rigid coupling may be provided so that the coupling element directly takes along, in particular linearly takes along, the latch in the manner of an entrainer, wherein a transfer of the coupling element from the passive position into the active position brings about a movement of the latch from the latched position into the unlatched position. Provision may generally also be made that, conversely, the movement of the latch into the latched position is brought about by the actuation element and by a movement of the coupling element from the active position into the passive position.

In the decoupled state, the coupling element is decoupled from the latch so that a movement of the coupling element may take place independently of a movement of the latch, and vice versa. The actuation element and the coupling element may also be in engagement with one another in the decoupled state so that an actuation of the actuation element brings about a movement of the coupling element from the passive state into the active state. In this respect, the latch is, however, not taken along into the unlatched position. An unlocking of the lock by the actuation element is therefore only possible in the coupled state.

In the lock in accordance with the invention, a movement of the actuation element may be decoupled from a movement of the latch into the unlatched position. In the decoupled state, even a forceful actuation or manipulation of the actuation element therefore remains without an effect on the latch, whereby an unauthorized unlocking of the lock is made much more difficult and the security of the lock is increased.

The actuation element may have a handle for a keyless actuation, whereby a high operating comfort is achieved. The handle may comprise a push button, a slider, or a pulling element for transmitting a linear actuation movement, in particular a pushing or pulling actuation movement, to the coupling element. The handle may comprise a rotary knob or a rotary handle, which may be operated by a rotational actuation movement, or a lever. The movement of the latch by the actuation element may in particular only take place through a manual actuation by a user without an electromotive movement of the latch being provided. The actuation element may generally comprise a lock cylinder and an associated key.

Advantageous embodiments of the invention are set forth in the dependent claims, in the description, and in the drawing.

In accordance with an embodiment, the coupling element is arranged movable in parallel with the latch. The coupling element and the latch may in particular have a common longitudinal axis along which they are each movably arranged.

The direction of movement of the actuation element may be oriented at least substantially perpendicular to a direction of movement of the latch and/or of the coupling element. To transmit an actuation movement from the actuation element to the coupling element, they may each have corresponding transmission features. For example, the actuation element and the coupling element may have cooperating control slopes by which an actuation movement of the actuation element is converted into a movement of the latch that is oriented at least substantially perpendicular to said actuation movement. A slot guide, a connecting rod, an articulated connection, or another gear connection may also be provided.

The latch may have a guide section in which the coupling element is guided. The guide section may be formed as a recess in the latch, for example, as a guide slot. The coupling element may be slidingly guided in the guide section.

In accordance with an embodiment, the lock comprises a control element for selectively transferring the coupling element into the coupled state or the decoupled state. The control element may itself be movably arranged for this purpose. The transfer of the coupling element between the coupled state and the decoupled state may in particular comprise a translational movement, in particular a linear movement, and/or a rotational movement of the control element.

The latch and the coupling element may be coupled by the control element in the coupled state. In the coupled state, the control element may at least sectionally be in engagement with the latch and the coupling element coupling them to one another.

In accordance with an embodiment, the control element is configured as a control fork that engages around the latch at three sides. The latch may extend at least partly along its direction of movement through an engaged-around region of the control fork that is defined by the control fork.

Alternatively or additionally, the control element may have at least one coupling pin for coupling the latch and the coupling element, in particular a coupling pin whose longitudinal axis extends perpendicular to a direction of movement of the latch. The at least one coupling pin may be configured such that, in the coupled state, it may be brought into engagement with the latch and the coupling element coupling them and such that, in the decoupled state, it may be brought into engagement either only with the latch or only with the coupling element or with neither of the two in order not to couple them to one another. To transfer between these two states, the coupling pin may be movably arranged. The transfer between the coupled state and the decoupled state may comprise a rotational movement and/or a translational movement of the coupling pin, in particular a linear movement of the coupling pin along its longitudinal axis. A plurality of coupling pins may be provided. The coupling pin may extend at least sectionally perpendicular to tine-like sections of the control fork.

The coupling element and the latch may each have at least one recess for receiving a coupling section of the control element, in particular for receiving a coupling pin. The latch and/or the coupling element may each have a plurality of recesses into which sections of the control element engage simultaneously or in each case only in the coupled state or only in the decoupled state.

The control element and the latch may be movably connected to one another. Such a movable connection may in particular exist both in the coupled state and in the decoupled state and independently of the unlatched position or the latched position of the latch. The latch and the control element may be connectable to one another at more than one connection point. For example, irrespective of the position of the latch or the coupled state, the latch may be connected to the control element at least at one connection point at any point in time.

A movement of the latch from the latched position into the unlatched position may bring about a rotational movement and/or a translational movement of the control element. The control element may be taken along by the latch without itself being driven to perform the rotational movement and/or the translational movement. The control element may in particular be pivoted about a suspension point by the latch.

In accordance with an embodiment, the lock has a blocking element that is adjustable between a blocking position, in which the latch is blocked in its latched position, and a release position in which the latch is movable into its unlatched position. The blocking element may in particular be configured as a pin or a spigot. The blocking element may generally cooperate with any desired movable element of the lock, but preferably with the latch itself, in order to block the latch.

In the blocking position, the locking mechanism therefore directly secures the counter-piece in the lock by means of the latch and the blocking element furthermore blocks the locking mechanism so that an actuation of said locking mechanism is only possible after an adjustment of the blocking element into the release position. A total of two release steps are therefore required to unlock the lock. An accidental movement of the latch into the unlatched position, for example during travel over uneven terrain or by a violent action on the lock, is particularly effectively prevented by the blocking element in the blocking position so that the security of the lock is increased.

An adjustment of the blocking element between the blocking position and the release position may comprise a rotational movement and/or a translational movement of the blocking element. For example, the adjustment of the blocking element may comprise a pivoting, a rotation, or a displacement of the blocking element or a combination thereof, in particular a linear movement along a longitudinal axis of the blocking element.

In accordance with an embodiment, the blocking element is formed at the control element. A longitudinal axis of the blocking element may be arranged in parallel with or coaxially to a longitudinal axis of the control element, in particular of a coupling pin. The control element may thus control both a transfer of the coupling element into the coupled state or the decoupled state and an adjustment of the blocking element between the blocking position and the release position, wherein both processes may take place simultaneously.

Provision may generally be made that, on the transfer of the coupling element into the decoupled state, the blocking element is transferred into its blocking position so that a manual movement of the latch by the actuation element is prevented and an accidental or violent movement of the latch into the unlatched position is additionally precluded by the blocking element located in the blocking position. In a comparable manner, provision may be made that, on the transfer of the coupling element into the coupled state in which a movement of the latch by the actuation element is possible, the blocking element is also adjusted into its release position to enable the movement of the latch into its unlatched position.

In accordance with an embodiment, in the blocking position of the blocking element, the blocking element is in engagement with a component of the lock, in particular with a non-movable component, such as a housing, of the lock. The component of the lock may be configured to prevent a movement of the blocking element along the direction of movement of the latch. A movable component of the lock may generally be provided to secure the blocking element in its blocking position. A corresponding receiver for the blocking element, which blocks a movement of the blocking element, in particular in the direction of movement of the latch, may be provided at the movable or non-movable component of the lock, in particular at the housing of the lock.

The latch may be able to be brought from the latched position into the unlatched position against a return force of a spring. Alternatively or additionally, the coupling element may be able to be brought from the passive position into the active position against the return force of a spring. It is thus ensured that the latch is generally urged into its latched position in the coupled state and in the decoupled state. The risk of an accidental release of the counter-piece from the locking mechanism is hereby reduced. Furthermore, due to the spring, a latch function may be implemented that enables an automatic latching in of the counter-piece, for example of an energy store, in the locking mechanism, wherein, after the latching in, the latch is automatically moved into the latched position by the spring.

The latch and the coupling element may be able to be brought into the unlatched position or into the active position against the return force of the same spring. It is hereby ensured that the coupling element and the latch are always correctly aligned relative to one another in the decoupled state and in particular in the passive position of the coupling element, and in particular that recesses of the latch and of the coupling element provided for the engagement of the control element are aligned with one another, in particular aligned flush with one another, such that the control element may engage therein for a transfer into the coupled state.

In accordance with an embodiment, the lock has at least one actuator for transferring the coupling element between the coupled state and the decoupled state. Alternatively or additionally, the lock has at least one actuator for adjusting the blocking element between its blocking position and its release position. The same actuator may be provided for transferring the coupling element and the blocking element, in particular wherein the transfer of the coupling element and the blocking element may take place simultaneously. The actuator may be an electromotive or electromagnetic actuator. A manual transfer of the blocking element into a blocking position or a release position or of the coupling element into a coupled state or a decoupled state by a user of the lock is thus unnecessary, whereby the operating comfort increases. Since only the blocking element and/or the coupling element is/are actuated by the actuator, but not the latch, an actuator with a smaller power and/or more compact dimensions may be used.

Provision may be made that the lock has a reception unit for receiving a release signal transmitted in a wired or wireless manner, in particular by a cell phone, wherein the release signal may include the instruction for transferring the coupling element into the coupled state or the decoupled state and/or the instruction for adjusting the blocking element into the release position or the blocking position. A keyless actuation of the lock may comprise that a manual movement of the latch by means of the actuation element into the unlatched position may take place after an electrical transfer of the coupling element into the coupled state and an electrical adjustment of the blocking element into the release position.

The lock may in particular comprise at least one actuator, in particular an electromotive or electromagnetic actuator, for actuating the control element. The control element may be rotationally and/or translationally moved by the actuator, in particular pivoted or displaced, in order thus to bring about a transfer of the coupling element and/or an adjustment of the blocking element.

To alert the user to a faulty locking, in particular an incomplete locking, of the lock, the lock may further comprise a detection means for detecting the adoption of the latched position by the latch. It may be monitored by the detection means whether the latch actually reaches its latched position during a locking process or whether it is hindered from doing so by an incorrectly inserted energy store, for example. In the latter case, a suitable warning may be output to the user, for example, in the form of visual and/or acoustic feedback generated at an onboard computer of an electric bicycle, at a cell phone of the user, and/or at the lock itself.

The detection means may, for example, comprise an actuator, in particular an electromotive or electromagnetic actuator, for adjusting a blocking element that is adjustable between a blocking position, in which the latch is blocked in its latched position, and a release position in which the latch is movable into its unlatched position. The actuator may in particular be the same actuator that is also provided for moving the control element.

The monitoring of the adoption of the latched position by the latch forms an independent aspect of the invention so that a further subject of the invention is a lock having the features of claim 20.

DRAWINGS

The invention will be described in the following purely by way of example with reference to a possible embodiment and to the enclosed drawing. There are shown:

Figure 1:
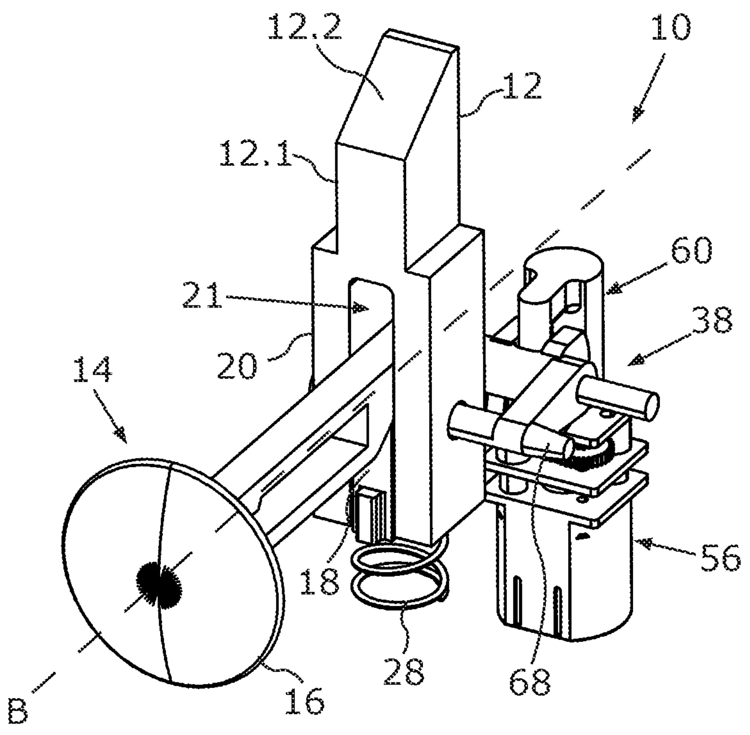
FIG. 1 is a perspective front view of a lock in accordance with the invention with a coupling element in a decoupled state.
Figure 13A:
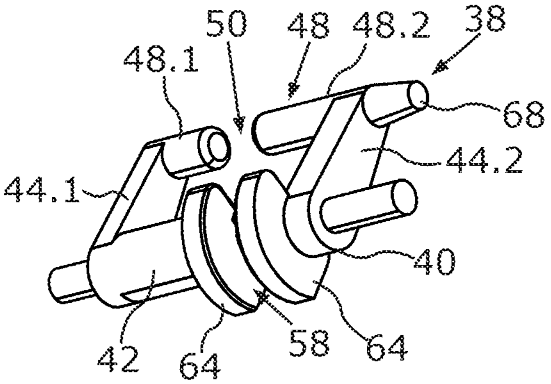
Figure 13B:
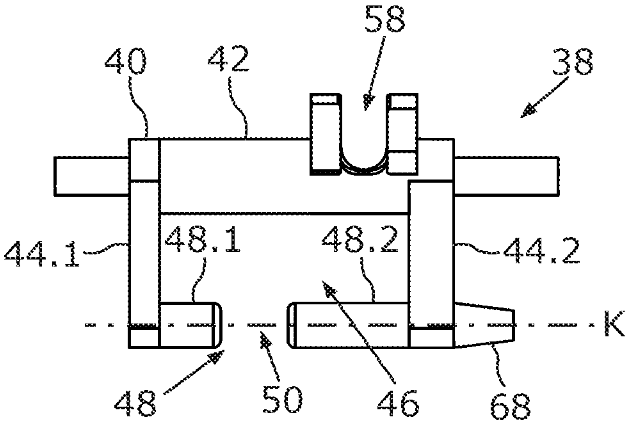
Figure 14:
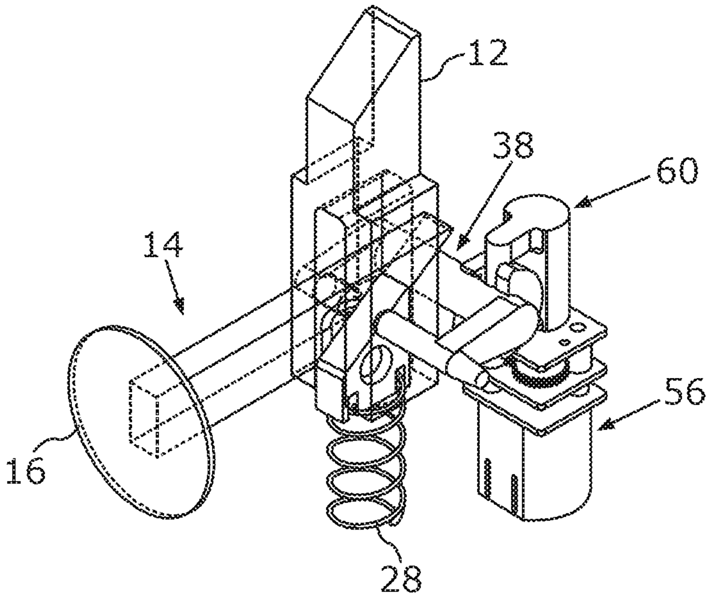
Figure 15:
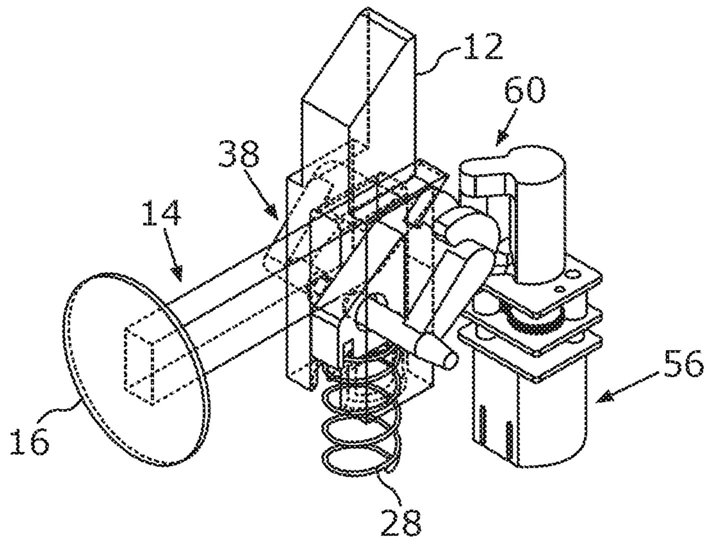

FIG. 13A a perspective view of a control element of the lock of FIG. 1;

FIG. 13B a plan view of the control element of FIG. 13A;

FIG. 14 illustrates the lock of FIG. 1 with the coupling element in the decoupled state, wherein the coupling element is transferred into the active position; and FIG. 15 illustrates the lock of FIG. 1 with the coupling element in the coupled state, wherein the coupling element is transferred into the active position and the latch is transferred into the unlatched position.

DESCRIPTION

A lock 10, in particular for an electric bicycle and, for example, for securing an energy store at the electric bicycle, is shown in FIGS. 1 to 15. In general, the lock may, however, also be used to lock doors, windows, drawers, transport boxes, containers, or generally as a substitute for a mechanical lock. The lock 10 comprises a locking mechanism having a latch 12 that has a locking section 12.1. The latch 12 is movable between a latched position and an unlatched position shown in FIG. 1 (FIG. 15). In the latched position, the locking section 12.1 of the latch 12 may be brought into engagement with a counter-piece movable relative to the locking mechanism, for example with the energy store (not shown), to secure said counter-piece in the lock 10, wherein the unlatched position is provided for the release of the counter-piece.

To move the latch from the latched position into the unlatched position, the lock 10 comprises a manually actuable actuation element 14 that comprises a handle 16 in the form of a push button in the embodiment shown. On an actuation of the push button, the actuation element 14 is displaced along an actuation axis B in the direction of the latch.

The actuation element 14 does not act directly on the latch 12 to move it into the unlatched position. Instead, a coupling element 18 is provided that is in engagement with the actuation element 14 (FIG. 8) and that can be moved from a passive position, as is shown in FIG. 1 (cf. also FIG. 8), into an active position, as is shown in FIGS. 14, 15, by said actuation element 14.

Figure 11A:
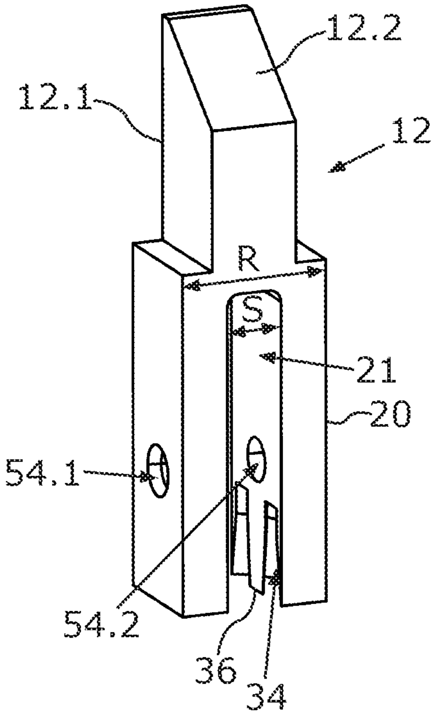
FIG. 11A is a perspective view of a latch of the lock of FIG. 1.
Figure 11B:
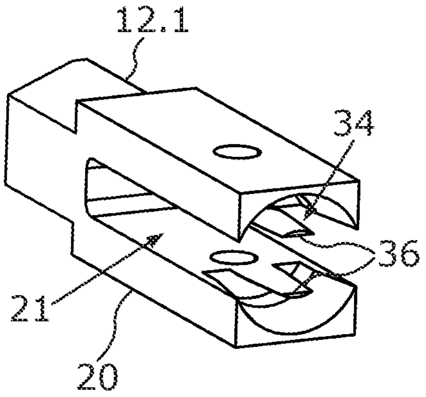
FIG. 11B is a further perspective view of the latch of FIG. 11A.
Figure 12:
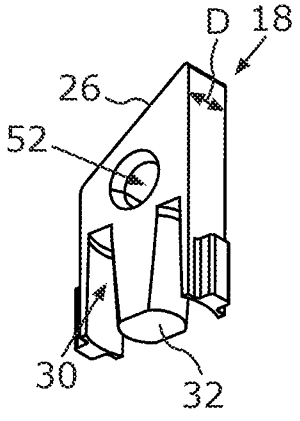
FIG. 12 is a perspective view of the coupling element of FIG. 1.

The coupling element 18 is arranged movable in parallel with the latch 12. The latch 12 and the coupling element 18 have a common longitudinal axis L (FIG. 10) that also defines the direction of movement of the latch 12 and the coupling element 18. The coupling element 18 is guided in a guide section 20 that is formed by the latch 12 and that comprises a guide slot 21 which is formed centrally within the latch 12 and in which the coupling element 18 is slidingly supported. The guide slot 21 has a lateral width S that approximately corresponds to a lateral extent D of the coupling element 18 (FIGS. 11A, 12).

Figure 8:
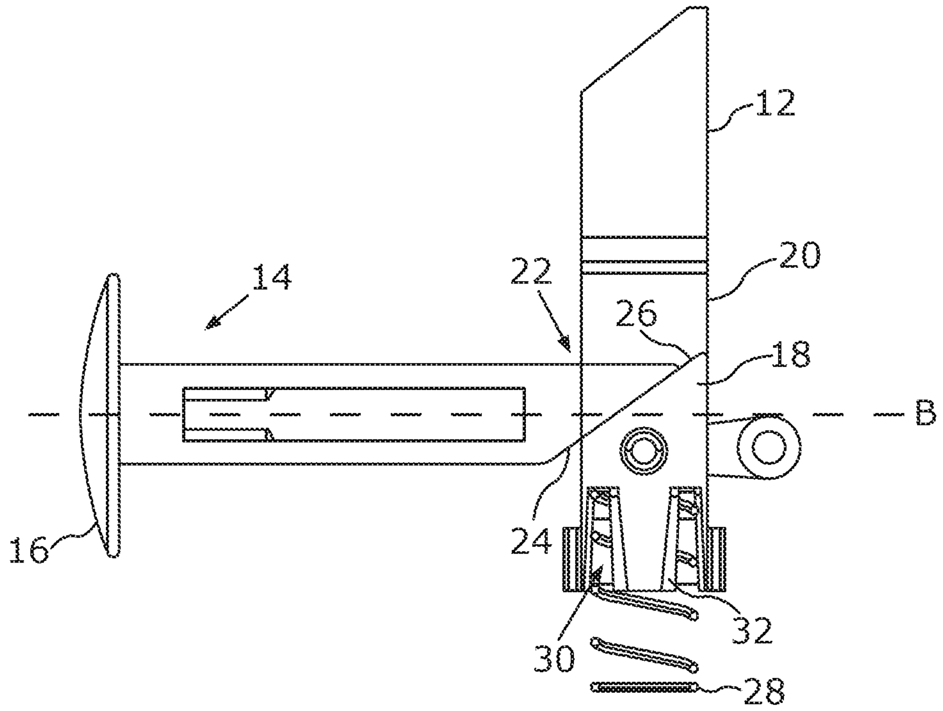
FIG. 8 is a sectional view of the lock of FIG. 1 along a plane that is defined by a direction of movement of a latch and by an actuation direction of an actuation element.

The longitudinal axis L of the latch 12 and of the coupling element 18, and thus their direction of movement, is oriented perpendicular to the direction of movement of the actuation element 14 along the actuation axis B. To convert the actuation movement of the actuation element 14 into the latch movement perpendicular thereto, the actuation element 14 has a transmission section 22 that has a first slanted control surface 24. Correspondingly thereto, the coupling element 18 has a second slanted control surface 26 along which the first inclined control surface 24 of the actuation element 14 is slidingly movable in the direction of the actuation axis B (FIG. 8).

The coupling element 18 is movably supported by means of a spring 28 and, on the pressing in of the actuation element 14, is urged into its active position by the first slanted control surface 24 against the return force of the spring 28 in the direction of the longitudinal axis L of said coupling element 18 (FIG. 14). The coupling element 18 has a bearing recess 30, into which the spring 28 configured as a coil spring may engage, for the support on the spring 28. Due to a bearing prolongation 32, the coupling element 18 is stably seated on the spring 28 (FIG. 12).

The latch 12 is supported by means of the same spring 28 so that it may be brought from its latched position into the unlatched position against the return force of the spring 28. At its end remote from the locking section 12.1, the latch 12 has a substantially annular bearing recess 34 for engaging into the spring 28, wherein a stable seat of the latch on the spring is ensured by two bearing tongues 36 that sectionally bound the annular bearing recess 34 at the inner side (FIGS. 11A, B).

Due to the support of the latch 12 by means of the spring 28, a latch function of the lock 10 may be implemented. The insertion of a counter-piece into the locking mechanism, for example of the energy store, may take place when the latch 12 is in the latched state since, on the insertion of the counter-piece, the latch 12 is pressed against the return force of the spring 28 into its unlatched position in the meantime. A control chamfer 12.2 is provided at the latch for this purpose. If the counter-piece is completely inserted into the lock 10, the latch 12 is automatically urged into its latched position by the spring 28 so that there is immediately protection against loss for the counter-piece.

In accordance with FIG. 1 to FIG. 9 and FIG. 14, the coupling element 18 is in a decoupled state in which it is movably arranged relative to the latch 12 so that a movement of the actuation element 14 and a thereby produced movement of the coupling element 18 from the passive position into the active position remain without an effect on the latch 12 (FIG. 14). To be able to move the latch 12 into its unlatched position by means of the actuation element 14, the coupling element 18 may be transferred into a coupled state in which it is coupled to the latch 12. In the coupled state, on an actuation of the actuation element 14, the coupling element 18 is transferred into the active position and the latch 12 coupled to the coupling element 18 is in this respect taken along into its unlatched position (FIG. 15).

A control element 38 is provided to transfer the coupling element 18 into the coupled state or into the decoupled state (FIGS. 13A, B). In the embodiment shown, the control element 38 is configured as a control fork 40 that comprises a first tine 44.1 and a second tine 44.2 in addition to a suspension strut 42. The control fork 40 engages around the latch 12 at three sides, wherein the surface 46 engaged around by the control fork 40 is oriented substantially perpendicular to the longitudinal axis L of the latch in the latched state of the latch 12 or in the passive position of the coupling element 18.

Figure 7:
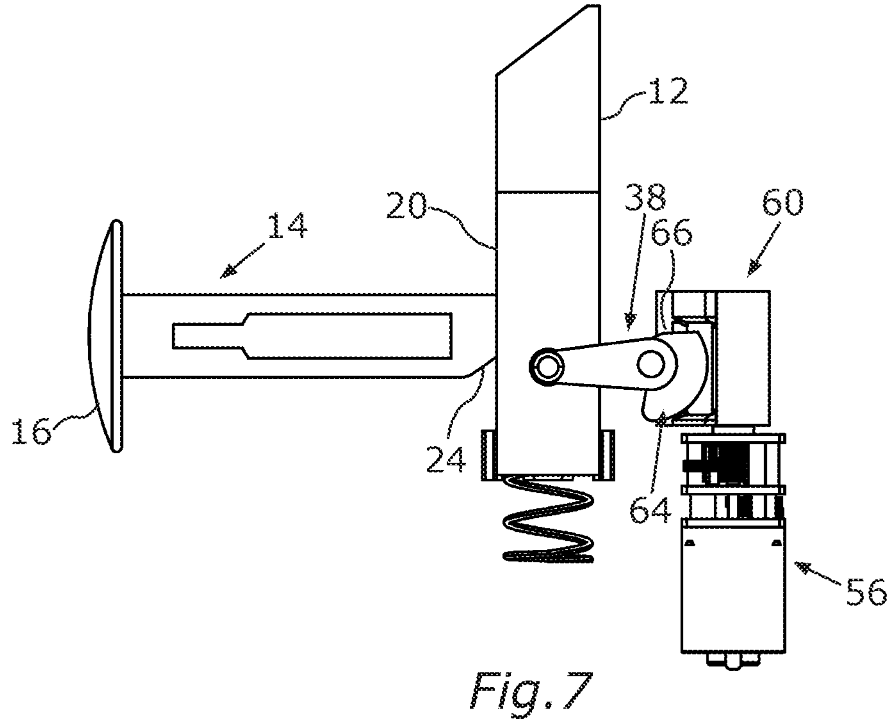
FIG. 7 is a side view of the lock of FIG. 1.
Figure 10:
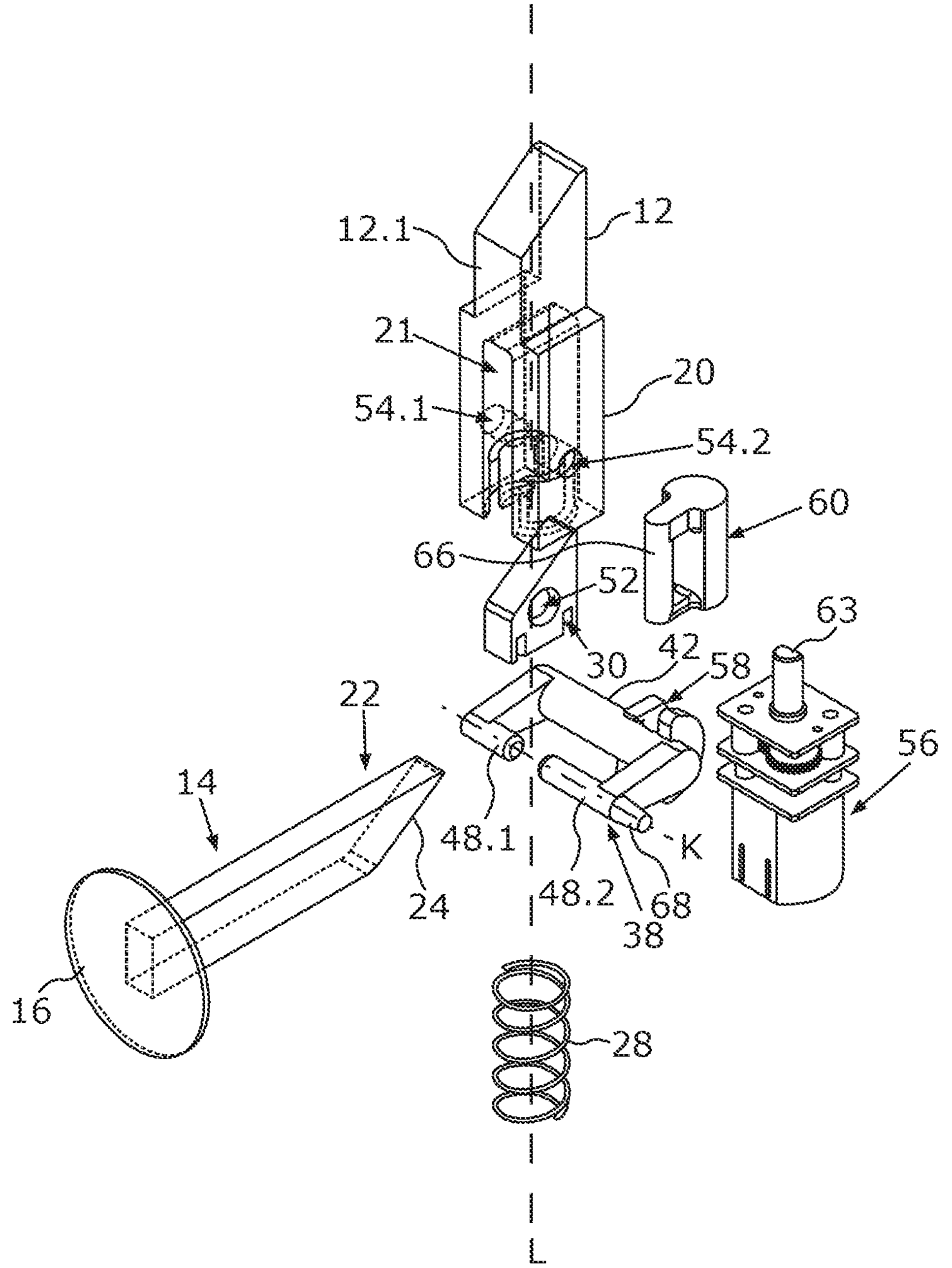
FIG. 10 is an exploded view of the lock of FIG. 1.

The control element 38 furthermore has a coupling pin 48 which extends between the first and second tine 44.1, 44.2 and whose longitudinal axis K is oriented perpendicular to the tines 44.1, 44.2 and to the direction of movement and the longitudinal axis L of the latch 12 and of the coupling element 18 (FIGS. 10, 13B). The coupling pin 48 is arranged at an end of the control fork 40 disposed opposite the suspension strut 42 and centrally impacts the latch 12 and the coupling element 18 in the assembled lock 10 with respect to the actuation axis B (FIGS. 2, 7).

To be able to receive the control element 38 and in particular the coupling pin 48 of the control element 38, the coupling element 18 and the latch 12 each have corresponding recesses. The coupling element 18 has a passage opening 52 whose diameter allows the passing through of the coupling pin 48 in the axial direction (FIG. 12). The latch 12 has a first passage opening 54.1 and a second passage opening 54.2 that are arranged at oppositely disposed sides of the latch 12 with respect to the longitudinal axis K of the coupling pin 48. Due to the common support of the latch 12 and the coupling element 18 by means of the spring 28, it is ensured that the passage openings 52, 54.1, 54.2 of the coupling element 18 and of the latch 12 are aligned flush with one another in the passive position.

The coupling pin 48 is formed in two parts and comprises a first coupling pin section 48.1 and a second coupling pin section 48.2 that are separated by a gap 50. The gap 50 approximately has the lateral width S of the guide slot 21, which is arranged in the latch 12, along the longitudinal axis K of the coupling pin 48. Therefore, the coupling element 18 may be arranged in the gap 50 such that said coupling element 18 does not come into engagement with the coupling pin 48. This characterizes precisely the decoupled state in accordance with FIG. 1 to FIG. 9 and FIG. 14 and is represented in the sectional representation by the coupling pin 48 in accordance with FIG. 9. In the decoupled state, the coupling element 18 may therefore be moved relative to the control element 38 independently of the control element 38 by the actuation element 14 (FIG. 14).

Figure 2:
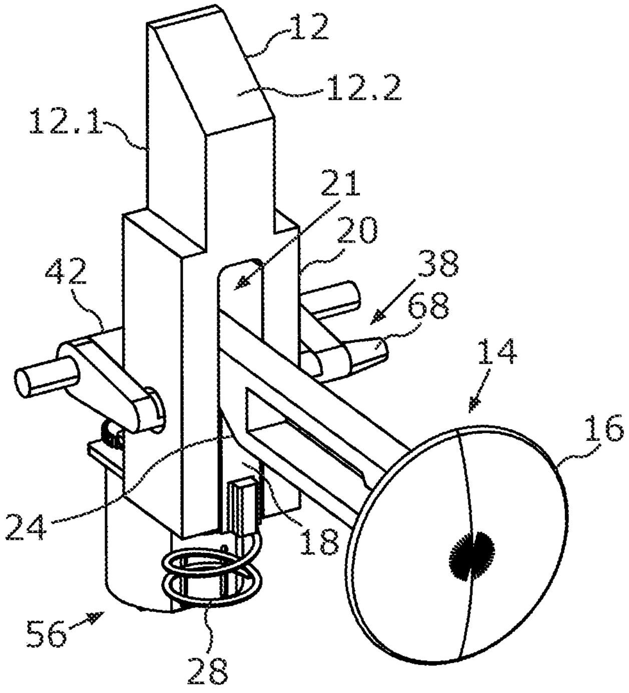
FIG. 2 is a further perspective front view of the lock of FIG. 1.
Figure 3:
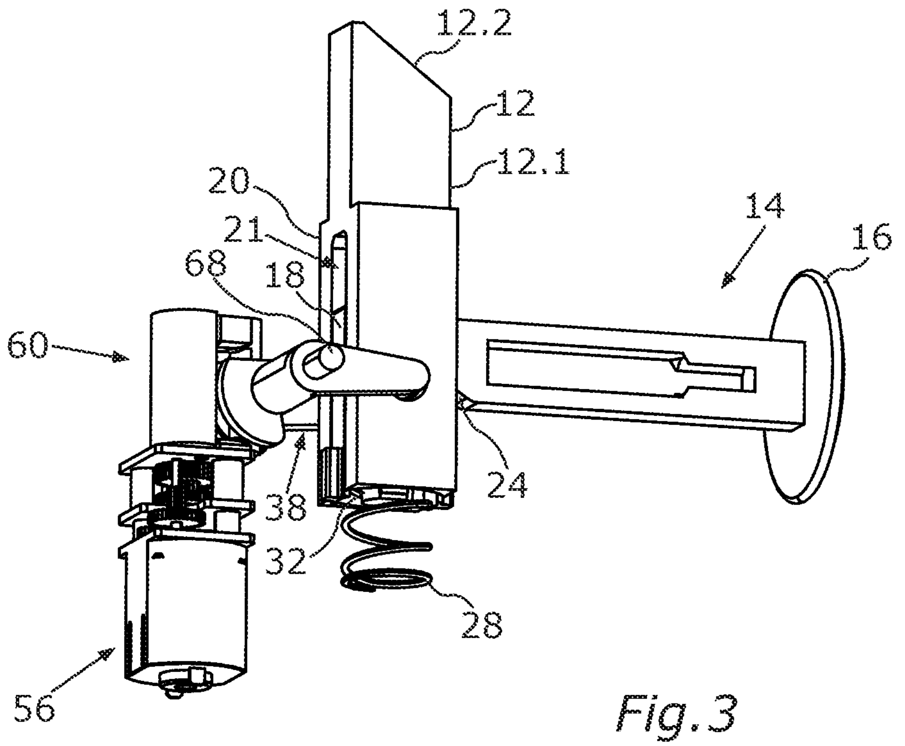
FIG. 3 is a perspective rear view of the lock of FIG. 1.
Figure 4:
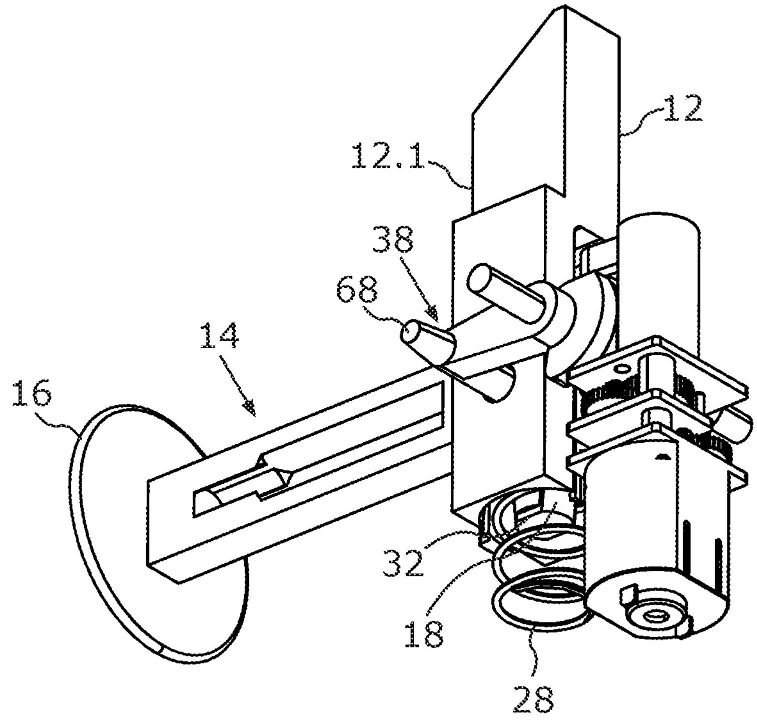
FIG. 4 is a further perspective rear view of the lock of FIG. 1.
Figure 5:
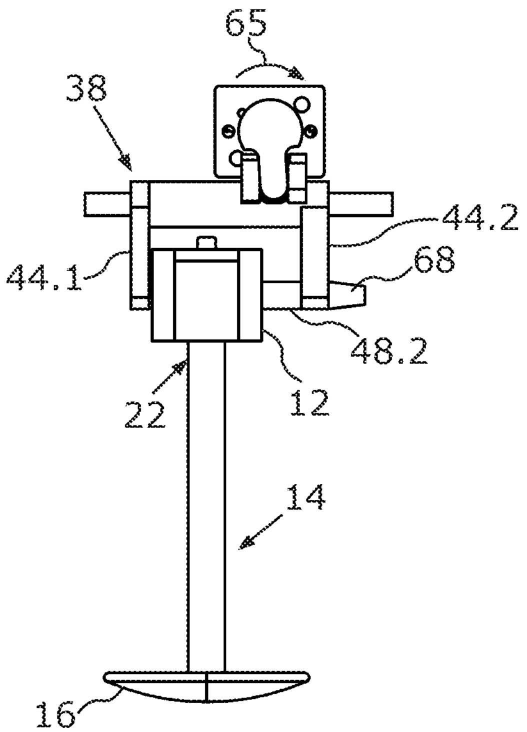
FIG. 5 is a plan view of the lock of FIG. 1.
Figure 6:
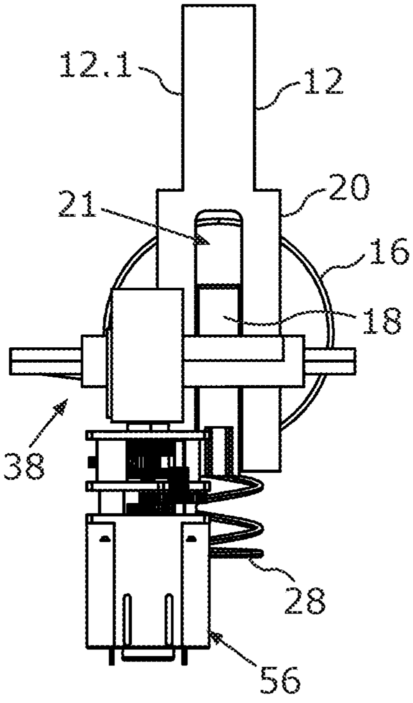
FIG. 6 is a rear view of the lock of FIG. 1.
Figure 9:
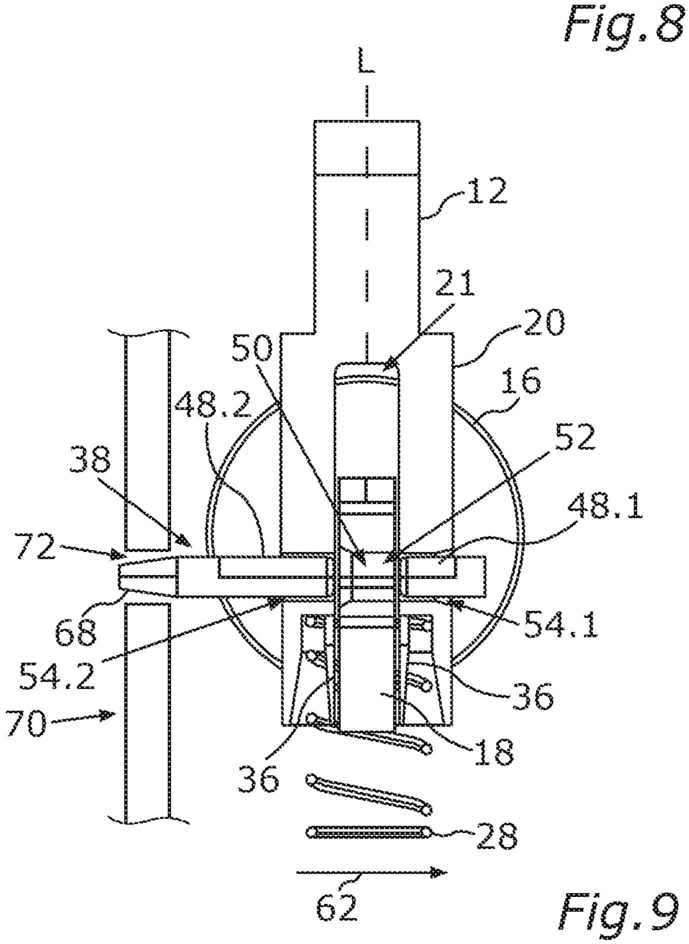
FIG. 9 is a further sectional view of the lock of FIG. 1 along a plane that is defined by the direction of movement of the latch and by a longitudinal axis of a coupling pin.

In the decoupled state in accordance with FIG. 1 to FIG. 9 and FIG. 14, the latch 12 is in engagement with the control element 38 by means of the first and second coupling pin sections 48.1, 48.2 that are introduced into the first or second passage opening 54.1, 54.2 (FIGS. 2, 9). The first tine 44.1 of the control fork 40 is almost in contact with the side of the latch 12 in which the first passage opening 54.1 is arranged and the first coupling pin section 48.1 is completely arranged in the passage opening 54.1 (FIG. 5).

To transfer the coupling element 18, starting from the decoupled state shown in FIG. 1 to FIG. 9 and FIG. 14, into the coupled state—and vice versa if necessary —, the lock 10 has an electric motor 56 that is connected to the control element 38 via the suspension strut 42. The suspension strut 42 has an articulated channel 58 that, in the embodiment shown, is connected in an articulated manner to a pivot arm 60 seated on a shaft 63 of the electric motor 56, wherein the pivot arm 60 may be pivoted into well-defined positions (arrow 65 in FIG. 5). A first position of the pivot arm 60 shown in FIG. 14 corresponds to the decoupled state in accordance with FIG. 1 to FIG. 9 and a second position of the pivot arm 60 shown in FIG. 15 corresponds to the coupled state of the coupling element 18.

A pivoting of the pivot arm 60 from the first position in accordance with FIG. 14 into the second position in accordance with FIG. 15 results in a linear displacement of the control element 38 along the longitudinal axis K of the coupling pin 48, wherein the direction 62 of the linear displacement is indicated by an arrow 62 in FIG. 9. Due to the linear displacement, the first coupling pin section 48.1 is pushed out of the first passage opening 54.1 and is thus brought out of engagement with the latch 12. The second coupling pin section 54.2 is guided completely through the second passage opening 54.2 and into the passage opening 52 of the coupling element 18. In this way, the latch 12 and the coupling element 18 are coupled to one another by the coupling pin 48 and in particular by the second coupling pin section 48.2 of the control element 38, i.e. the coupling element 18 is therefore brought into its coupled state (FIG. 15).

In this coupled state, the coupling element 18 is rigidly connected to the latch 12 with respect to the direction of movement along the longitudinal axis L of the coupling element 18 so that, on the actuation of the actuation element 14, said latch 12 is taken along by the coupling element 18 into its unlatched position. In this respect, the coupling pin 48 is also taken along the longitudinal axis L of the latch 12 so that the control element 38 is rotated, wherein a longitudinal axis of the articulated channel 58 is tilted in the direction of the latch 12 (FIG. 15). The articulated channel 58 is bounded at two sides by rounded wall sections 64 between which a cam section 66 of the pivot arm 60 is received. In addition to the rotational movement of the control element 38 in the direction of the latch 12, a translational movement of the control element 38 in the direction of the latch 12, in particular in parallel with the actuation axis B, may also be provided, by which translational movement it is ensured that the latch 12 with its passage openings 54.1, 54.2, the coupling element 18 with its passage opening 52, and the coupling pin 48 are always aligned with one another with respect to the actuation axis B. In the overall view, the coupling pin 48 of the control element 38 is thus effectively displaced in parallel with the longitudinal axis L of the latch. The wall sections 64 are configured such that they provide a secure guidance of the control element 38 during the rotational movement and the translational movement.

The latch 12 is in engagement with the control element 38 not only in the coupled state, but also in the decoupled state (FIG. 9), wherein the latch 12 and the control element 38 are movably connected to one another. A relative rotation about the longitudinal axis K of the coupling pin 48 (FIG. 15) and a relative translation in the direction of the arrow 62 or in the reverse direction are in particular possible (FIG. 9).

The lock 10 furthermore has a blocking element 68 that is configured as a blocking pin at the control element 38 in the embodiment shown, said blocking pin extending coaxially to the coupling pin 48 from the second tine 44.2 toward an outer side of the control fork 40. The blocking element 68 may be adjusted between a blocking position, in which the latch 12 is blocked in its latched position by the blocking element 68, and a release position in which the latch 12 is movable into its unlatched position. To block a movement of the latch 12 from its latched position, the blocking element 68 may, in its blocking position, be in engagement with a component of the lock 10. In the embodiment shown, provision is made that the blocking element 68 is in engagement with a non-movable housing of the lock 10, specifically with a housing wall 70, in the blocking position (FIG. 9). An opening 72 is formed in the housing wall 70 for this purpose, said opening 72 receiving the blocking element 68 in its blocked state and blocking a movement of the blocking element 68 along the longitudinal axis L of the latch 12.

Since the blocking element 68 is formed at the control element 38, which is always connected to the latch 12 by means of the coupling pin 48 and specifically by means of the second coupling pin section 48.2 coaxial to the blocking element 68, a movement of the latch 12 along its longitudinal axis L, and thus a movement into the unlatched position, is also blocked by the fixing of the blocking element 68 in the blocking position.

The adjustment of the blocking element 68 from the blocking position in accordance with FIG. 9 into the release position takes place by means of the electric motor 56. Since said electric motor 56 linearly displaces the control element 38 along the direction 62 (FIG. 9), the blocking element 68 is released from the opening 72 of the housing wall 70 and thus enables a movement along the longitudinal axis L of the latch 12.

The movement of the blocking element 68 into the release position is simultaneously accompanied by a transfer of the coupling element 18 into its coupled state so that, on the one hand, the movement of the latch 12 into the unlatched position is no longer blocked by the blocking element and, on the other hand, an actuation of the actuation element 14 actually enables an adjustment of the latch 12 into the unlatched position.

On the other hand, in accordance with the embodiment shown, the coupling element 18 is also in its decoupled state when the blocking element 68 is located in the blocking position. Thus, on the one hand, the actuation of the latch 12 by means of the actuation element 14 and thus also the manipulability of the lock 10 are precluded, while an unintentional adjustment of the latch 12 into the unlatched position is additionally prevented by the blocking element 68.

It is understood that the blocking element 68 has to be aligned with the opening 72 of the housing wall so that the blocking element 68 may be brought into engagement with the opening 72, i.e. may therefore move into said opening 72. In other words, the transfer of the blocking element 68 from the release position back into the blocking position requires the latch 12 to be located in its latched position. If, in contrast, the latch 12 does not return completely into its latched position starting from its unlatched position, for example, because the energy store to be secured has not been inserted correctly, the blocking element 68 coupled to the latch 12 also cannot move into the opening 72, and consequently cannot reach its blocking position, due to the lack of alignment with the opening 72 of the housing wall 70. Accordingly, in this case, the coupling element 18 does not reach its decoupled state, i.e. it is not decoupled from the latch 12.

Since the displacement of the blocking element 68 from the release position back into the blocking position takes place by means of the electric motor 56, it may be monitored by means of the electric motor 56 whether the blocking element 68 reaches its blocking position or not. For example, the electric motor 56 may be a stepper motor by means of which it may be detected how far the blocking element 68 may actually be moved. Alternatively, it may be concluded from an increased power consumption of the electric motor 68 that the blocking element 68 abuts the housing wall 70 instead of moving into the opening 72.

If it is determined by means of the electric motor 56 that the blocking element 68 cannot reach its blocking position and the latch 12 is thus not located in its latched position, a corresponding warning may be output to the user of the lock 10 so that the user may check and, if necessary, correct the functional state of the lock 10 and/or the position of the energy store. Specifically, the warning, e.g. in the form of visual and/or acoustic feedback, may be output at an onboard computer of the electric bicycle, at a cell phone of the user, and/or at the lock 10 itself.

The invention claimed is:

1. A lock comprising:

a locking mechanism having a latch that is movable between a latched position, which is provided for securing a counter-piece movable relative to the locking mechanism, and an unlatched position provided for releasing the counter-piece;

an actuation element for manually moving the latch into the unlatched position; and a coupling element that can be transferred between a coupled state, in which it is coupled to the latch, and a decoupled state, in which it is movable relative to the latch, and that can be moved from a passive position into an active position by means of the actuation element, wherein the latch can be moved into the unlatched position by a movement of the coupling element, which is in the coupled state, from the passive position into the active position by the actuation element;

further comprising a control element for selectively transferring the coupling element into the coupled state or the decoupled state, the control element comprising first and second coupling sections;

wherein the latch and the coupling element are coupled by the control element in the coupled state;

wherein, in the coupled state, the second coupling section of the control element is in engagement with the latch and the coupling element coupling them to one another.

2. The lock in accordance with claim 1, wherein the direction of movement of the actuation element is oriented at least substantially perpendicular to a direction of movement of the latch and/or of the coupling element.

3. The lock in accordance with claim 1, wherein the latch has a guide section in which the coupling element is guided.

4. The lock in accordance with claim 1, wherein the control element is configured as a control fork that engages around the latch at three sides.

5. The lock in accordance with claim 1, wherein the control element has at least one coupling pin for coupling the latch and the coupling element.

6. The lock in accordance with claim 1, wherein the coupling element and the latch each have at least one recess for receiving the control element.

7. The lock in accordance with claim 1, wherein the control element and the latch are movably connected to one another.

8. The lock in accordance with claim 1, wherein a movement of the latch from the latched position into the unlatched position brings about a rotational movement of the control element.

9. The lock in accordance with claim 1, further comprising a blocking element that is adjustable between a blocking position, in which the latch is blocked in its latched position, and a release position in which the latch is movable into its unlatched position.

10. The lock in accordance with claim 1, wherein the latch can be brought from the latched position into the unlatched position against a return force of a spring.

11. The lock in accordance with claim 1, wherein the coupling element can be brought from the passive position into the active position against a return force of a spring.

12. The lock in accordance with claim 1, wherein the latch can be brought from the latched position into the unlatched position against a return force of a spring and the coupling element can be brought from the passive position into the active position against the return force of the same spring.

13. The lock in accordance with claim 1, wherein the lock comprises an actuator for transferring the coupling element between the coupled state and the decoupled state and/or for adjusting a blocking element, which is adjustable between a blocking position, in which the latch is blocked in its latched position, and a release position in which the latch is movable into its unlatched position, between its blocking position and its release position.

14. The lock in accordance with claim 1, wherein the lock comprises at least one actuator for actuating the control element.

15. The lock in accordance with claim 1, further comprising an actuator configured for detecting the adoption of the latched position by the latch, wherein the actuator comprises an electric motor and a controller configured to control the electric motor and to detect power consumption of the electric motor, and the detecting of the adoption of the latched position is based on the detecting of the power consumption of the electric motor to determine an abutting contact of a blocking element with a housing wall or wherein the actuator is an electric stepper motor and the detecting of the adoption of the latched position is based on a detected degree of actuation of the electric stepper motor to determine how far the blocking element has moved.

16. The lock in accordance with claim 1, further comprising an actuator for adjusting a blocking element that is adjustable between a blocking position, in which the latch is blocked in its latched position, and a release position in which the latch is movable into its unlatched position, wherein the actuator is configured to detect the adoption of the latched position by the latch, wherein the actuator comprises an electric motor and a controller configured to control the electric motor and to detect a power consumption of the electric motor, and the detecting of the adoption of the latched position is based on the detected power consumption of the electric motor to determine an abutting contact of the blocking element with a housing wall, or wherein the actuator is an electric stepper motor and the detecting of the adoption of the latched position is based on a detected degree of actuation of the electric stepper motor to determine how far the blocking element has moved.

17. A lock comprising:

a locking mechanism having a latch that is movable between a latched position, which is provided for securing a counter-piece movable relative to the locking mechanism, and an unlatched position provided for releasing the counter-piece;

an actuation element for manually moving the latch into the unlatched position; and a coupling element that can be transferred between a coupled state, in which it is coupled to the latch, and a decoupled state, in which it is movable relative to the latch, and that can be moved from a passive position into an active position by means of the actuation element, wherein the latch can be moved into the unlatched position by a movement of the coupling element, which is in the coupled state, from the passive position into the active position by the actuation element;

wherein the latch has a guide section which is formed as a guide slot shaft in the latch and in which the coupling element is slidingly guided and movable in parallel with the latch.

18. The lock in accordance with claim 17, further comprising a control element for selectively transferring the coupling element into the coupled state or the decoupled state.

19. The lock in accordance with claim 18, wherein the latch and the coupling element are coupled by the control element in the coupled state.

20. The lock in accordance with claim 17, the lock further comprising an actuator for adjusting a blocking element that is adjustable between a blocking position in which the latch is blocked in its latched position, and a release position in which the latch is movable into its unlatched position;

wherein the actuator comprises an electric motor and a controller configured to control the electric motor; and wherein the controller is further configured to detect a power consumption of the electric motor to detect the adoption of the latched position by the latch based on the detected power consumption of the electric motor to determine an abutting contact of the blocking element, or wherein the electric motor is a stepper motor and the controller is further configured to detect the adoption of the latched position based on a detected degree of actuation of the electric motor to determine how far the blocking element has moved.

21. A lock comprising:

a locking mechanism having a latch that is movable between a latched position, which is provided for securing a counter-piece movable relative to the locking mechanism, and an unlatched position provided for releasing the counter-piece;

an actuation element for manually moving the latch into the unlatched position; and a coupling element that can be transferred between a coupled state, in which it is coupled to the latch, and a decoupled state, in which it is movable relative to the latch, and that can be moved from a passive position into an active position by means of the actuation element, wherein the latch can be moved into the unlatched position by a movement of the coupling element, which is in the coupled state, from the passive position into the active position by the actuation element;

further comprising a blocking element that is adjustable between a blocking position, in which the latch is blocked in its latched position, and a release position in which the latch is movable into its unlatched position;

further comprising a control element for selectively transferring the coupling element into the coupled state or the decoupled state, wherein the blocking element is formed at the control element.

22. The lock in accordance with claim 21, wherein in the blocking position of the blocking element, the blocking element is in engagement with a non-movable component of the lock.

* * * * *